United States Patent [19]
Burlew

[11] Patent Number: 6,054,055
[45] Date of Patent: Apr. 25, 2000

[54] OIL CONGEALING COMPOSITION

[75] Inventor: James O. Burlew, Topeka, Kans.

[73] Assignee: Joan E. Docter, Oakwood, Ohio

[21] Appl. No.: 09/293,352

[22] Filed: Apr. 16, 1999

[51] Int. Cl.⁷ .............................. B01D 21/01; C09K 3/32
[52] U.S. Cl. .................... 210/728; 210/925; 510/215; 510/407; 510/432; 510/506; 510/500
[58] Field of Search ...................... 210/680, 728, 210/749, 924, 925; 510/432, 500, 506, 407, 212, 215

[56] References Cited

U.S. PATENT DOCUMENTS

| | | | |
|---|---|---|---|
| 2,447,551 | 8/1948 | Zisman et al. | 252/1 |
| 2,464,204 | 3/1949 | Baker | 210/680 |
| 3,198,731 | 8/1965 | De Lew | 210/774 |
| 3,265,616 | 8/1966 | Wyllie et al. | 210/693 |
| 3,414,511 | 12/1968 | Hitzman | 210/671 |
| 3,520,806 | 7/1970 | Haigh | 210/692 |
| 3,941,694 | 3/1976 | Scott | 210/772 |
| 4,027,512 | 6/1977 | Treat | 72/42 |
| 4,098,694 | 7/1978 | Perlaky | 525/312 |
| 4,110,213 | 8/1978 | Tennant et al. | 516/74 |
| 4,190,531 | 2/1980 | Falk | 210/753 |
| 4,361,658 | 11/1982 | Lundberg et al. | 523/132 |
| 4,448,926 | 5/1984 | Lundberg et al. | 524/612 |
| 4,502,975 | 3/1985 | Kobayashi et al. | 516/102 |
| 4,597,893 | 7/1986 | Byford et al. | 516/59 |
| 5,015,391 | 5/1991 | Mohn | 210/708 |
| 5,120,708 | 6/1992 | Melear et al. | 507/126 |

FOREIGN PATENT DOCUMENTS

| | | |
|---|---|---|
| 471971 | 4/1974 | Australia . |
| 0021571 | 1/1981 | European Pat. Off. . |
| 3416357 | 11/1985 | Germany . |

*Primary Examiner*—Kery Fries
*Assistant Examiner*—Christine E. Ingersoll
*Attorney, Agent, or Firm*—R. William Graham

[57] ABSTRACT

The invention discloses oil congealing compositions to coagulate oil that has been spilled on water. The congealing composition is oliophilic based and floats on the water surface to contract and congeal oil spills in both salt and fresh water, which includes in significant amounts a polypropylene glycol ether, an alcohol, an ester and polyoxyalkyl glycol ether. After the congealing composition is applied to the oil spill, the floating congealed oil can be readily mechanically removed from the water such that at least 99.9% of the oil is removable from the water with minimal negative environmental impact.

32 Claims, No Drawings

OIL CONGEALING COMPOSITION

FIELD OF INVENTION

The invention generally relates to a chemical composition that can be used as a congealant for oil, and a method of making and using the same. More particularly, the invention is drawn to compositions synthesized from particular combinations of oliophilic compositions and polymers which are environmentally acceptable and suitable for congealing oil for removal. An embodiment of the invention includes an oil congealing compound for treating oil spills and sheens, which comprises a blend of a polypropylene glycol ether, polyoxyalkyl ether, linear aliphatic alcohol, a polyglycol ether and an ester.

RELATED ART

Major oil spills in both fresh and salt water continue to be significant concerns. Oil spills damage marine life, contaminate water, damage the shoreline and damage birds and other wild life that are dependent upon the contaiminated water. Thus, compositions which control an oil spill and aid in removal from a water surface are greatly needed.

Existing methods of controlling oil spills include fences, booms, and skimmers to physically contain or remove oil on a water surface as well as coagulants and catalysts which chemically interact with the oil and absorbing material such as straw.

While these other compositions and methods aid in removing spilled oil from a water surface, they fail to provide an adequate environmentally acceptable solution which is able to confine, coagulate and control spilled oil in a short period of time before the oil drops below the surface of the water and forms an emulsion with the water, rendering removal virtually impossible.

An oil congealing composition disclosed in the present invention utilizes blends of oliophilics, hydrotropes and hydrophilic surface agents which quickly congeal the oil and retain it above water surface. Furthermore, the composition of the present invention is environmentally degradable, friendly and stable.

SUMMARY OF THE INVENTION

It is an object of the present invention to provide an oil congealing a composition and a method for using the composition, the composition having the ability to congeal oil and in particular, fuel oil, crude oil, and non-detergent motor oil.

It is also an object of the present invention to provide a composition that will quickly congeal oil and to retain it on the surface of the water.

It is a further object of the present invention to provide oil congealing compositions that controls oil spilled in water in an environmentally acceptable manner.

Accordingly, the present invention is directed to oil congealing compositions and method of use. The composition includes a blend of a polyalkylene glycol ether, polyoxyalkylene alkyl ether, linear aliphatic alcohol, a glycol ether and an ester. An embodiment the composition includes:
a blend of:
  a glycol other which is present in an amount of between about 15 to 25 parts by weight and has the formula H—O($C_3H_6$)$_3$O—R wherein R is an alkyl or an alkenyl having between one and four carbons;
  a polyoxyalkylene glycol ether which is present in an amount between about 25 to 35 parts by weight and has the formula
  $R^1$—O($R^2$O)nOH wherein $R^1$ is an alkyl or an alkenyl having between twelve to eighteen carbons $R^2$ is an alkyl or an alkenyl having between two and three carbons; and n is between two and twenty;
  a polyalkylene glycol ether which is present in an amount of between about 15 to 25 parts by weight and has the formula
  H—O($C_3H_6O$)$_n$—R wherein R is an alkyl or an alkenyl having between one and four carbons and n is between three and twenty;
  a linear or branched aliphatic alcohol having about 10 to 13 carbons present in an amount between about 15–25 parts by weight;
  an polyoxyalkylene alkyl ether which is present in an amount between 0.5 and 9.5 parts by weight and has the formula
  HOCH$_2$—(CH$_2$CH$_2$O)$_n$—(CH$_2$)$_{n2}$—OH, wherein n is between two and twenty and $n_2$ is between nine and eighteen;
  an ester is present in an amount between 5 and 15 parts by weight and has the formula
  CH$_3$(CH$_2$)$_n$—C—O$_2$—R, wherein n is between eleven and eighteen and R is an alkyl or alkenyl having between two and four carbons.

A preferred embodiment includes tripropylene glycol monobutyl ether, polyoxyethylene (2) oleyl ether, 1-dodecanol, polyoxyethylene glycol monobutyl ether, isopropyl tetradecenoate and polyoxyethylene (20) undecyl ether, wherein the polyoxyethylene (2) oleyl ether and the polyoxyethylene (20) undecyl ether are present in a ratio of about 15:1 to 1:15, preferably about 10:1.

Another embodiment of the invention includes:
a blend of:
  a polyoxyalkylene glycol ether which is present in an amount between about 25 to 35 parts by weight and has the formula
  $R^1$O($R^2$O)nOH wherein $R^1$ is an alkyl or an alkenyl having between twelve to eighteen carbons $R^2$ is an alkyl or an alkenyl having between two and three carbons and n is between two and twenty;
  a polyalkyl glycol ether which is present in an amount of between about 10 to 20 parts by weight and has the formula
  H—O($C_3H_6O$)$_n$—R wherein R is an alkyl or an alkenyl having between one and four carbons and n is between three and twenty;
  a linear or branched aliphatic alcohol having about 8 to 16 carbon atoms present in an amount between about 15–25 parts by weight;
  an aliphatic alcohol present in an amount between about 15–25 parts by weight and which has the formula;
  CH$_3$(CH$_2$)$_n$CH(C$_2$H$_5$)CH$_2$OH where n is between three and eleven;
  an alkyl pyrrolidinone present in an amount between about 0.5–9.5 parts by weight and which has the formula
  CH$_3$(CH$_2$)$_n$CHNC$_4$H$_6$O where n is between eight and eleven;
  an polyoxyalkylene alkyl ether which is present in an amount between 0.5 and 4.5 parts by weight and has the formula
  HOCH$_2$—(CH$_2$CH$_2$O)$_n$—(CH$_2$)$_{n2}$—OH, wherein n is between two and twenty and $n_2$ is between nine and eighteen;
  an polyoxyalkylene alkyl amine which is present in an amount between 0.5 and 4.5 parts by weight and has the formula $HOCH_2-(CH_2CH_2O)_n-(CH_2)_{n2}-ONH_2$, wherein n is between two and twenty and $n_2$ is between nine and eighteen;

an ester is present in an amount between 5 and 15 parts by weight and has the formula $CH_3(CH_2)_n-COOR$, wherein n is between eleven and eighteen and R is an alkyl or alkenyl having between two and four carbons.

A preferred embodiment includes tripropylene glycol monobutyl ether, polyoxyethylene (2) oleyl ether, 1-dodecanol, polyoxyethylene glycol monobutyl ether, isopropyl tetradecenoate and polyoxyethylene (20) undecyl ether.

DEFINITIONS

Oillophilic means oil soluble.

Hydrophilic means water soluble.

Hydrophobic means dislikes water.

Oleophitic means having the capacity to attract oil to itself.

Synergist means to work or cooperate with another to provide greater benefit than the expected beneficial sum of the individual components.

Hydrotrope means a co-solvent in a detergent used to hold components in the solution.

Surfactant means a substance that facilitates the spreading of another substance.

Minimun toxicity means about five to ten times the toxicity of sodium chloride, wherein sodium chloride has a toxicity as measured in rats as oral toxicity $ld_{50}$ 1.75 grams/kg of body weight.

DETAILED DESCRIPTION

The present invention described herein sets forth a unique composition and method to congeal oil spills. The composition is made from a blend of predominantly oliophilic, hydrotrope materials with less than one percent hydrophilic materials. The composition provides a contracting oleophilic physical effect. In a preferred embodiment, the composition includes a blend of tripropylene glycol monobutyl ether, polyoxyethylene (2) oleyl ether, 1-dodecanol, polyoxyethylene glycol monobutyl ether, isopropyl tetradecenoate, and polyoxyethylene (20) undecyl ether. In another embodiment the invention includes a blend of 2-ethyl-1-hexanol, 1-dodecyl-2-pyrrolidinone, polyoxyethylene (2) oleyl ether, 1-dodecanol, polyoxyethylene glycol monobutyl ether, isopropyl hexadecenoate, and polyoxyethylene (20) undecyl ether.

In the first embodiment, a glycol ether, preferably, tripropylene glycol monobutyl ether, is used as an intermediate solvent and hydrotrope ingredient in an amount of about twenty parts by weight plus or minus five parts per weight. Other glycol ethers which may be used instead or in mixture therewith are tripropylene glycol methyl ether, poly (propylene glycol) monobutyl ether, and where minimum water solubility is essential. These compounds, but not necessarily limited thereto, provide suitable characteristics and has a relatively high flash point (Fp) (greater than 170° F.) and are non-toxic and non-irritants. Here, ethylene glycol ethers are not recommended for substitution due to their greater densities and toxicities.

The oliophilic surfactant, a fatty ether, used herein is a polyoxyethylene (2) oleyl ether in an amount of about thirty parts by weight plus or minus five parts by weight. Other fatty ethers may be used in place or in mixture with this component, such as polyoxyethylene (4) lauryl ether, polyoxyethylene (2) cetyl ether, polyoxyethylene (2) stearyl ether and other ethoxylated ethers where the (EO) number remains low to assure oliophilic oil soluble properties.

Another oliophilic intermediate solvent and hydrotrope of the present invention is a polyalkylene glycol ether, preferably, polypropylene glycol monobutyl ether (Mol ca 340) in twenty parts by weight plus or minus five parts by weight is included. Other glycol ethers such as polypropylene glycol diglycidyl ether, may be used having substituted alkyl groups wherein the flash point Fp is maintained sufficiently high and polymer size provides a suitable oliophilic intermediate solvent and hydrotrope.

An oliophilic intermediate solvent and extender of the present invention is a linear aliphatic alcohol, particularly, 1-dodecanol, which is provided in an amount of about twenty parts by weight plus or minus five parts by weight. Other aliphatic alcohols may be used provided they have an adequate flash point Fp greater than or equal to 170° F. For example, 1-undecanol has a flash point Fp of 200° F. and is acceptable as does 2-undecanol with an acceptable flash point Fp of 235° F. and 1-decanol, and the linear alcohol having the formula $CH_3(CH_2)nCHOH$ where n is between eight and eleven.

A miscible solvent ester, preferably, isopropoyl tetradecenoate is provided in an amount of about nine and one half parts by weight plus or minus five parts by weight. Substituted esters may include in part or whole, ethyl tetradecenoate, isopropyl hexadecenoate, methyl oleate and ethyl undecylenate.

Finally, a hydrophilic surface active agent is provided in the form of an ethoxylated ether, preferably, polyethoxylated (20) undecyl ether, in an amount of about five parts by weight plus or minus four and one half parts by weight. Other ethers which can be substituted in full or in part mixture therewith includes polyoxyethylene (20) cetyl ether, polyoxyethylene (20) stearyl ether, polyoxyethylene (2) sorbitan mono oleate ether, and polyoxyethylene (20) olecyl ether. Essentially, any hydrophilic non-toxic high (EO) number ethyoxylated ether is usable.

EXAMPLE

A 1000 liter volume batch was made using the following ingredients:

200 l tripropylene glycol monobutyl ether, 300 l polyoxyethylene (2) oleyl ether, 200 l 1-dodecanol, 200 l polyoxyethylene glycol monobutyl ether, 95 l isopropyl tetradecenoate and 5 l polyoxyethylene (20) undecyl ether were mixed and stirred until completely blended.

The example composition provided a viscous colorless liquid. It exhibited a boiling point of 187° C., a melting point –05° C., a flash point of 110° C. (230° F.) and nonflammable. The composition was found to have a specific gravity of 0.904, a pour point of (–10° C., 14° F.), and neutral pH. Moreover, the composition was found to be insoluble in fresh and sea water and miscible in hydrocarbon solvents. Finally, the composition exhibited relatively unlimited shelf life and oral-rat toxicity of 20 grams/kilogram.

The particular composition and proportional components are believed to play a vital role in the congealing effect on oil. Approximately 10% of the given ingredient proportions assure a specific gravity of 0.904 or lower with respect to saltwater. Thus, the composition provided is buoyant on the water surface.

The glycol ethers above essentially provide a solvent, extender and non-ionic intermediate hydrotrope. The composition provides excellent affinity for surface oils with minimal detrimental efforts on the environment due to their insolubilities and surface action confinement.

The composition of the present invention can be applied using an aerial must spray onto floating slicks and sheens. Alternatively, the composition may be emulsified into equal volume spray applications. Still another application is to treat kiln dried sawdust with the composition thus providing a congealing absorbing material. The described composition has broad temperature range applications from 32° F. to 120° F.

In the alternative preferred embodiment, the tripropylene glycol butyl ether is substituted with a 2-ethyl-1-hexanol which is an extender and diluent for a composition preferred to have lower pour point and viscosity. 2-Ethyl-1-hexanol has a flash point Fp of 171° F. and the toxicity is 12.46 ml/kg $LD_{50}$ oral rat as compared to 5.8 ml/kg for isopropyl alcohol and 6.6 ml/kg of ethylene glycol. Here, isopropyl hexadecenoate is used in place of isopropyl tetradecenoate. Additionally, 1-dodecyl-2-pyrrolidinone is used in an amount of about 5 parts by weight plus or minus four and one half parts by weight which replaces part of the polypropylene glycol monobutyl ether and also includes a minor amount of polyoxyethylene (30) oleyl amine, about 0.2 parts by weight plus or minus 0.15 parts by weight, which in part replaces the polyoxyethylene (20) undecyl ether.

EXAMPLE

A 1000 liter volume batch was made using the following ingredients:

200 l 2-Ethyl-1-hexanol, 50 l 1-dodecyl-2-pyrrolidinone, 300 l polyoxyethylene (2) oleyl ether, 200 l 1-dodecanol, 150 l polyoxyethylene glycol monobutyl ether, 95 l isopropyl hexadecenoate, 3 l polyoxyethylene (20) undecyl ether, and 2 l polyoxyethylene (30) oleyl amine were mixed and stirred until completely blended.

The example composition provided a viscous colorless liquid. It exhibited a boiling point of 183–186° C., a melting point 0° C., a flash point Fp of 81° C. (178° F.) and nonflammable. The composition was found to have a specific gravity of 0.88, a pour point of (−5° C.), and neutral pH. Moreover, the composition was found to be insoluble in fresh and sea water and miscible in hydrocarbon solvents. Finally, the composition exhibited relatively unlimited shelf life and oral-rat toxicity of 20 grams/kilogram.

The particular composition and proportional components are believed to play a vital role in the congealing effect on oil. Approximately 99% of the given ingredient proportions assure a specific gravity of 0.88 or lower with respect to saltwater. Thus, the composition provided is buoyant on the water surface with minimum solubility.

Similarly, the composition provides excellent affinity for surface oils with minimal detrimental effects on the environment. The composition of the present invention can be applied using an aerial mist spray onto floating slicks and sheens. Alternatively, the composition may be emulsified into equal volume spray applications or applied to treat kiln dried sawdust or spun low density silica fibers to provide a congealing absorbing material. The described composition has broad temperature range applications from 0° F. to 49° F.).

The examples provide a non-ionic congealing composition which is free from aromatics and electrolytes, known or suspected carcinogens, mutagens and tetragens while retaining highly suitable congealing qualities. The class of compositions set forth herein are predominantly water insoluble and therefore efficiently maintain oil on the surface of the water and avoid emulsifying effects commonly known to exist in the field with existing oil spill treating compositions.

What is claimed is:

1. An oil congealing composition for use in congealing oil spills and sheens, comprising:

at least one glycol ether having in the fomula H—O $(C_3H_6O)_3$—R wherein R is an alkyl or an alkenyl having between one and four carbons;

at least one polyoxyalkenyl glycol ether;

at least one polyalkenyl glycol ether having the formula H—O$(C_3H_6O)$n—R wherein R is an alkyl or an alkenyl having between one and four carbons and n is between three and twenty;

at least one aliphatic alcohol;

at least one ester at least one polyoxyalkylene alkyl ether.

2. The composition of claim 1, wherein said glycol ether includes at least one of tripropylene glycol monobutyl ether, tripropylene glycol methyl ether, poly(propylene glycol), monobutyl ether or a mixture thereof.

3. The composition of claim 1, wherein said polyoxyalkylene glycol ether includes at least one of polyoxyethylated (2) oleyl ether, polyoxyethylene (4) lauryl ether, polyoxyethylene (2) cetyl ether, polyoxyethylene (2) stearyl ether or a mixture thereof.

4. The composition of claim 1, wherein said aliphatic alcohol includes at least one of 1-dodecanol, 2-undecanol, 1-nonanol, 1-decanol, 2-ethyl-1-hexanol or a mixture thereof.

5. The composition of claim 1, wherein said polyalkylene glycol ether includes at least one of polypropylene glycol monbutyl ether, polypropylene glycol diglycidyl ether, or a mixture thereof.

6. The composition of claim 1, wherein said ester includes at least one of isopropyl tetradecenoate, ethyl tetradecenoate, isopropyl hexadecenoate, ethyl undecylenate, methyl oleate or a mixture thereof.

7. The composition of claim 1, wherein said polyoxyalkylene alkyl ether includes at least one of polyethoxylated (20) undecyl ether, polyoxyethylene (20) cetyl ether, polyoxyethylene (20) stearyl ether, polyoxyethylene (20) olecyl ether, polyoxyethylene (2) sorbitan mono oleate ether or a mixture thereof.

8. The composition of claim 1, wherein said glycol ether is present in an amount of between 15 to 25 parts by weight.

9. The composition of claim 1, wherein said polyalkylene glycol ether is present in an amount of between 15 to 25 parts by weight.

10. The composition of claim 1, wherein said aliphatic alcohol is present in an amount between about 15–25 parts by weight and has the formula $CH_3(CH_2)_nCHOH$ where n is between eight and eleven.

11. The composition of claim 1, wherein said polyoxyalkylene glycol ether is present in an amount between about 25 to 35 parts by weight and has the formula $R^1$—O$(OR^2)$ nOH wherein $R^1$ is an alkyl or an alkenyl having between twelve to eighteen carbons $R^2$ is an alkyl or an alkenyl having between two and three carbons; and n is between two and twenty.

12. The composition of claim 1, wherein said polyoxyalkylene alkyl ether is present in an amount between 0.5 and 9.5 parts by weight and has the formula $HOCH_2—(CH_2CH_2O)_n—(CH_2)_{n2}—OH$, wherein n is between two and twenty and $n_2$ is between nine and eighteen.

13. The composition of claim 1, wherein said ester is present in an amount between 5 and 15 parts by weight and has the formula $CH_3(CH_2)_n—C—O_2—R$, wherein n is between eleven and eighteen and R is an alkyl or alkenyl having between two and four carbons.

14. The composition of claim 1, wherein said composition further includes an oil absorbing material which is at least partially saturated with said glycol ether, said polyoxyalkylene glycol ether, said polyalkylene glycol ether, said aliphatic alcohol, said ester and said polyoxyalkylene alkyl ether.

15. An oil congealing composition, which includes a blend of:
   at least one polyoxyalkylene glycol ether;
   at least one polyalkyl glycol ether;
   at least one aliphatic alcohol;
   at least one ester;
   at least one alkyl pyrrolidinone;
   at least one polyoxyalkylene alkyl ether; and
   at least one polyoxyethylene alkyl amine.

16. The composition of claim 15, wherein said polyoxyalkylene glycol ether includes at least one of polyoxyethylated (2) oleyl ether, polyoxyethylene (4) lauryl ether, polyoxyethylene (2) cetyl ether, polyoxyethylene (2) stearyl ether or a mixture thereof.

17. The composition of claim 15, wherein said aliphatic alcohol includes at least one of 1-dodecanol or 2-undecanol, 1-nonanol, 1-decanol, 2-ethyl-1-hexanol or a mixture thereof.

18. The composition of claim 15, wherein said polyalkyl glycol ether includes at least one of polypropylene glycol monobutyl ether, polypropylene glycol diglycidyl ether or a mixture thereof.

19. The composition of claim 15, wherein said ester includes at least one of isopropyl tetradecenoate, ethyl tetradecenoate, isopropyl hexadecenoate, ethyl undecylenate, methyl oleate or a mixture thereof.

20. The composition of claim 15, wherein said polyoxyalkylene alkyl ether includes at least one of polyethoxylated (20) undecyl ether, polyoxyethylene (2) cetyl ether, polyoxyethylene (2) stearyl ether, polyoxethylene (2) oleyl ether, polyoxyethylene (2) sorbitan mono oleate ether or a mixture thereof.

21. The composition of claim 15, wherein said polyoxyethylene alkyl amine is polyoxyethylene (30) oleyl amine.

22. The composition of claim 15, wherein said polyoxyalkylene glycol ether is present in an amount between about 25 to 35 parts by weight and has the formula $R^1O(R^2O)nOH$ wherein $R^1$ is an alkyl or an alkenyl having between twelve to eighteen carbons, $R^2$ is an alkyl or an alkenyl having between two and three carbons and n is between two and twenty.

23. The composition of claim 15, wherein said polyalkyl glycol ether is present in an amount of between about 10 to 20 parts by weight and has the formula $H—O(C_3H_6O)_n—R$ wherein R is an alkyl or an alkenyl having between one and four carbons and n is between three and twenty.

24. The composition of claim 15, wherein said aliphatic alcohol is present in an amount between about 15–25 parts by weight and which has the formula
   $CH_3(CH_2)_nCHOH$ where n is between eight and eleven;
   wherein n is a linear or branched aliphatic alcohol having about 8 to 16 carbon atoms present in an amount between about 15–25 parts by weight.

25. The composition of claim 15, wherein said alkyl pyrrolidinone present in an amount between about 0.5–9.5 parts by weight and which has the formula
   $CH_3(CH_2)_nCHNC_4H_6O$ where n is between eight and eleven.

26. The composition of claim 15, wherein said polyoxyalkylene alkyl ether is present in an amount between 0.5 and 4.5 parts by weight and has the formula
   $HOCH_2—(CH_2CH_2O)_n—(CH_2)_{n2}—OH$, wherein n is between two and twenty and $n_2$ is between nine and eighteen.

27. The composition of claim 15, wherein said polyoxyalkylene alkyl amine which is present in an amount between 0.5 and 4.5 parts by weight and has the formula
   $HOCH_2—(CH_2CH_2O)_n—(CH_2)_{n2}—ONH_2$, wherein n is between two and twenty and $n_2$ is between nine and eighteen.

28. The composition of claim 15, wherein said ester is present in an amount between 5 and 15 parts by weight and has the formula
   $CH_3(CH_2)_n—C—O_2—R$, wherein n is between eleven and eighteen and R is an alkyl or alkenyl having between two and four carbons.

29. A method of congealing oil spills, which includes the steps of: dispersing onto an oil spill an effective amount of oil congealing composition, wherein said oil congealing composition includes:
   at least one glycol ether having the formula $H—O(C_3H_6O)_3—R$ wherein R is an alkyl or an alkenyl having between one and four carbons;
   at least one polyoxyalkenyl glycol ether;
   at least one polyalkenyl glycol ether having the formula $H—O(C_3H_6O)n—R$ wherein R is an alkyl or an alkenyl having between one and four carbons and n is between three and twenty;
   at least one aliphatic alcohol;
   at least one polyoxyalkylene alkyl ether.

30. The method of claim 29, which further includes the step of dispersing onto the oil spill an oil absorbing material which is at least partially saturated with said glycol ether, said polyoxyalkylene glycol ether, said polyalkylene glycol ether, said aliphatic alcohol, said ester, and said polyoxyalkylene alkyl ether.

31. A method of congealing oil spills, which includes the steps of:
   dispersing onto an oil spill an effective amount of oil congealing composition, wherein said oil congealing composition includes:
   at least one polyoxyalkylene glycol ether;
   at least one polyalkyl glycol ether;
   at least one aliphatic alcohol;
   at least one ester;
   at least one alkyl pyrrolidinone;
   at least one polyoxyalkylene alkyl ether; and
   at least one polyoxyethylene alkyl amine.

32. The method of claim 31, which further includes the step of dispersing onto the oil spill an oil absorbing material which is at least partially saturated with said polyoxyalkylene glycol ether, said polyalkyl glycol ether, said aliphatic alcohol, said ester, said alkyl pyrrolidinone, said polyoxyalkylene alkyl ether; and said polyoxyethylene alkyl amine.

* * * * *